US012798384B2

(12) United States Patent
Kinomura

(10) Patent No.: US 12,798,384 B2
(45) Date of Patent: Nov. 17, 2026

(54) VEHICLE CONTROLLER, VEHICLE, POWER SUPPLY SYSTEM, DISCHARGE CONNECTOR, AND POWER SUPPLY METHOD

(71) Applicant: TOYOTA JIDOSHA KABUSHIKI KAISHA, Toyota (JP)

(72) Inventor: Shigeki Kinomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/175,618

(22) Filed: Apr. 10, 2025

(65) Prior Publication Data

US 2025/0236178 A1 Jul. 24, 2025

Related U.S. Application Data

(63) Continuation of application No. 17/886,665, filed on Aug. 12, 2022, now Pat. No. 12,296,686.

(30) Foreign Application Priority Data

Aug. 16, 2021 (JP) ................................ 2021-132278

(51) Int. Cl.
*B60L 1/00* (2006.01)
*B60L 53/16* (2019.01)

(52) U.S. Cl.
CPC ............... *B60L 1/006* (2013.01); *B60L 53/16* (2019.02)

(58) Field of Classification Search
CPC .......... B60L 1/006; B60L 53/16; B60L 53/66; B60L 55/00; Y02T 10/70; Y02T 10/7072; Y02T 90/14
See application file for complete search history.

(56) References Cited

U.S. PATENT DOCUMENTS 9,545,851 B2 * 1/2017 Manotas, Jr. ........... B60L 53/65
2011/0204851 A1 * 8/2011 Manotas, Jr. ........... B60L 55/00 320/128

(Continued)

FOREIGN PATENT DOCUMENTS

BR 122025015257 A2 * 1/2026
CN 103444042 B * 8/2016 ............. B60L 50/16

(Continued)

OTHER PUBLICATIONS

U.S. Appl. No. 17/886,665, filed Aug. 12, 2022, Shigeki Kinomura.

(Continued)

*Primary Examiner* — Adam D Houston
(74) *Attorney, Agent, or Firm* — Dinsmore & Shohl LLP

(57) ABSTRACT

An electronic control unit (ECU) controls a vehicle capable of externally discharging an electric power via a discharge connector. The vehicle includes: an on-board inverter that adjusts the voltage of an alternating current (AC) power; and a vehicle inlet that discharges to the discharge connector the AC power output from the power converter when the discharge connector is connected to the vehicle inlet. The vehicle inlet has a CP terminal through which a control pilot (CPLT) signal is transmitted when the vehicle 1 is charged externally. The ECU includes a processor. The processor determines the voltage of the AC power output from the on-board inverter, based on the voltage of the CP terminal.

10 Claims, 12 Drawing Sheets

(56) References Cited

U.S. PATENT DOCUMENTS

| | | | | |
|---|---|---|---|---|
| 2013/0314034 | A1 | 11/2013 | Ang | |
| 2014/0191569 | A1 | 7/2014 | Sawada et al. | |
| 2016/0152154 | A1 | 6/2016 | Mizuno et al. | |
| 2018/0086213 | A1* | 3/2018 | Jefferies | H01R 31/065 |
| 2018/0170195 | A1* | 6/2018 | Jefferies | B60L 53/16 |
| 2023/0048830 | A1* | 2/2023 | Kinomura | B60L 1/006 |
| 2023/0051862 | A1* | 2/2023 | Kinomura | B60L 1/006 |
| 2024/0075826 | A1* | 3/2024 | Miller | B60L 55/00 |
| 2024/0399915 | A1* | 12/2024 | Veselic | B60L 53/63 |
| 2025/0162432 | A1* | 5/2025 | Magnuski | B60L 53/305 |
| 2025/0236178 | A1* | 7/2025 | Kinomura | B60L 1/006 |
| 2026/0189055 | A1* | 7/2026 | Mhiesan | H02B 1/04 |

FOREIGN PATENT DOCUMENTS

| | | | | | |
|---|---|---|---|---|---|
| DE | 102024120525 | A1 | * | 4/2025 | H02J 7/933 |
| EP | 2605340 | A1 | | 6/2013 | |
| EP | 3744553 | A1 | | 12/2020 | |
| JP | 2011-238428 | A | | 11/2011 | |
| JP | 5123419 | B1 | | 1/2013 | |
| JP | 2013-051754 | A | | 3/2013 | |
| JP | 2015-012697 | A | | 1/2015 | |
| JP | 5662390 | B2 | * | 1/2015 | B60L 58/15 |
| JP | 2017-079540 | A | | 4/2017 | |
| JP | 2018-207587 | A | | 12/2018 | |
| JP | 2026512350 | A | * | 4/2026 | H02J 3/322 |
| KR | 101306091 | B1 | * | 9/2013 | B60L 3/04 |
| KR | 20230046357 | A | * | 4/2023 | B60L 53/14 |
| WO | 2012/111081 | A1 | | 8/2012 | |
| WO | 2013/030646 | A2 | | 3/2013 | |
| WO | 2021/015227 | A1 | | 1/2021 | |
| WO | WO-2025126160 | A2 | * | 6/2025 | B60L 53/68 |

OTHER PUBLICATIONS

Corrected Notice of Allowance dated Feb. 28, 2025, issued to U.S. Appl. No. 17/886,665.

Notice of Allowance dated Jan. 14, 2025, issued to U.S. Appl. No. 17/886,665.

Corrected Notice of Allowance dated Jan. 22, 2025, issued to U.S. Appl. No. 17/886,665.

Corrected Notice of Allowance dated Jan. 28, 2025, issued to U.S. Appl. No. 17/886,665.

* cited by examiner

VEHICLE CONTROLLER, VEHICLE, POWER SUPPLY SYSTEM, DISCHARGE CONNECTOR, AND POWER SUPPLY METHOD

CROSS-REFERENCE TO RELATED APPLICATION

This nonprovisional application is a continuation of U.S. patent application Ser. No. 17/886,665 filed on Aug. 12, 2022, which claims priority to Japanese Patent Application No. 2021-132278 filed on Aug. 16, 2021 with the Japan Patent Office, the entire content of which applications are hereby incorporated by reference.

BACKGROUND

Field

The present disclosure relates to a vehicle controller, a vehicle, power supply system, a discharge connector, and a power supply method.

Description of the Background Art

Vehicles are known which are capable of supplying electric power externally. Supplying of electric power from a vehicle to an electronic device is also called V2L (Vehicle to Load). Various techniques related to V2L are proposed. For example, Japanese Patent No. 5123419 discloses a connector for connecting a vehicle and an electronic device which receives power supply from the vehicle.

SUMMARY

In order to use various electronic devices, etc., there is a demand for supply of electric power that has a voltage appropriate to the operating voltage of an electronic device. In particular, desirably, the electric power having an appropriate voltage can be supplied in an as simple configuration as possible.

The present disclosure is made in view of the problem above, and an object of the present disclosure is to supply an electric power having an appropriate voltage, in a simple configuration.

(1) A vehicle controller according to a certain aspect of the present disclosure controls a vehicle capable of externally discharging an electric power via a discharge connector. The vehicle includes: a power converter that adjusts a voltage of an electric power; and a connector that, when the discharge connector is connected to the connector, discharges to the discharge connector an electric power output from the power converter. The connector has a CP terminal through which a control pilot signal is transmitted when the vehicle is charged externally. The vehicle controller includes a processor. The processor determines a voltage of the electric power output from the power converter, based on a voltage on the CP terminal.

The processor: determines the voltage of the electric power output from the power converter to a first voltage, when the voltage on the CP terminal is lower than a predetermined voltage; and determines the voltage of the electric power output from the power converter to a second voltage different from the first voltage, when the voltage on the CP terminal is higher than the predetermined voltage.

(3) The processor: determines the voltage of the electric power output from the power converter to a first voltage, when the voltage on the CP terminal is an open-circuit voltage; and determines the voltage of the electric power output from the power converter to a second voltage different from the first voltage, when the voltage on the CP terminal differs from the open-circuit voltage.

(4) The connector further has a CS terminal through which a proximity detection signal is transmitted. The processor determines the voltage of the electric power output from the power converter to the second voltage, when the voltage on the CP terminal depends on a voltage on the CS terminal.

(5) The processor determines the voltage of the electric power output from the power converter to the second voltage, when the voltage on the CP terminal is equal to the voltage on the CS terminal.

(6) A vehicle according to another aspect of the present disclosure includes the vehicle controller described above.

(7) A power supply system according to still another aspect of the present disclosure includes the vehicle and discharge connector described above.

(8) A discharge connector according to still another aspect of the present disclosure is configured to be connected to a connector included in a vehicle. The discharge connector includes: a CS terminal through which a proximity detection signal is transmitted; and a signal terminal. The signal terminal is configured to be connected to a CP terminal included in the vehicle, the CP terminal being a terminal through which a control pilot signal is transmitted when the vehicle is charged externally, the signal terminal being electrically connected to the CS terminal.

(9) The discharge connector further includes: a discharge start switch that receives a user operation for causing an electric power to be discharged from the connector; and a switch that electrically connects the CS terminal and the signal terminal when the discharge start switch receives the user operation.

(10) A method according to still another aspect of the present disclosure supplies an electric power from a vehicle to outside via a discharge connector. The vehicle includes a connector to which the discharge connector is connected, and adjusts a voltage of an electric power discharged from the connector. The connector has a CP terminal through which a control pilot signal is transmitted when the vehicle is charged externally. The method includes: obtaining a voltage on the CP terminal; and switching voltages output from the connector, based on the voltage on the CP terminal.

The foregoing and other objects, features, aspects and advantages of the present disclosure will become more apparent from the following detailed description of the present disclosure when taken in conjunction with the accompanying drawings.

DETAILED DESCRIPTION

Hereinafter, the present embodiment according to the present disclosure will be described in detail, with reference to the accompanying drawings. Note that the same reference sign is used to refer to the same or like parts, and the description thereof will not be repeated.

[Present Embodiment]

<System Configuration>

Figure 1:
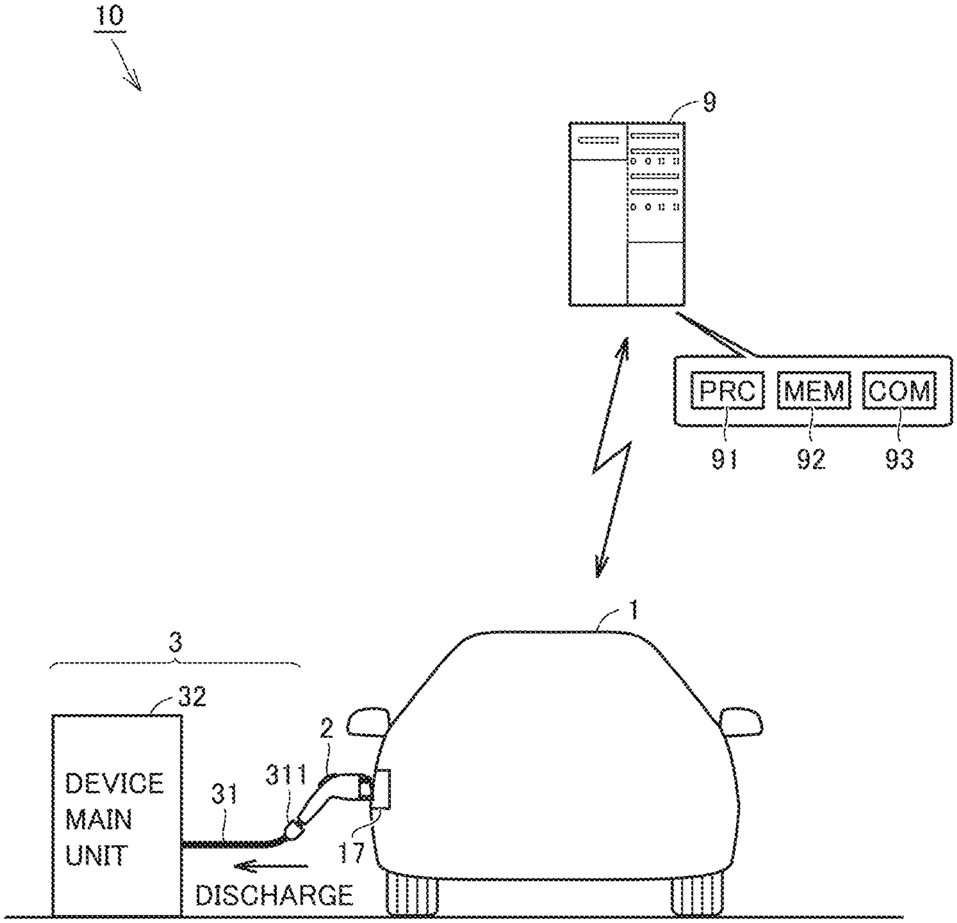
FIG. 1 is a diagram schematically showing an overall configuration of a power supply system according to an embodiment of the present disclosure.

FIG. 1 is a diagram schematically showing an overall configuration of a power supply system according to the present embodiment. A power supply system 10 includes a vehicle 1, a discharge connector 2, an electronic device 3, and a server 9.

The vehicle 1 is capable of performing V2L. The vehicle 1 according to the present embodiment is capable of discharging an alternating current (AC) power to the electronic device 3. More specifically, the vehicle 1 is a battery electric vehicle (BEV), a plug-in hybrid electric vehicle (PHEV), a fuel cell electric vehicle (FCEV), etc.

The discharge connector 2 is also called a vehicle power connector (VPC), and connected to a vehicle inlet 17 of the vehicle 1. The electric power discharged from the vehicle 1 is supplied to a device main unit 32 via the discharge connector 2 and a power cable 31 of the electronic device 3. A specific configuration of the discharge connector 2 according to the present embodiment will be described, with respect to FIGS. 2, 3, 6, and 7.

In this example, the electronic device 3 operates by consuming AC power. The type of the electronic device 3 is not particularly limited. The electronic device 3 is not limited to be a home appliance (consumer appliance), and may be an industrial appliance (heavy electrical equipment). In this example, the operating voltage for the electronic device 3 is AC 100V (corresponding to a "first voltage" according to the present disclosure) or AC 200V (corresponding to a "second voltage" according to the present disclosure). However, the operating voltage of the electronic device 3 can depend on a sales area of the electronic device 3, for example. The operating voltage of the electronic device 3 may also be AC 120V or AC 240V, for example. The electronic device 3 may also operate by consuming direct current (DC) power.

The server 9 includes a processor 91 such as a central processing unit (CPU), a memory 92 such as a read only memory (ROM) and a random access memory (RAM), and a communication device 93. The processor 91 executes arithmetic processes related to a discharge control over an electric power from the vehicle 1 to the electronic device 3. The memory 92 stores programs which can be executed by the processor 91. Using the communication device 93, the server 9 performs two-way wireless communications with the vehicle 1. The server 9 transmits commands to the vehicle 1, thereby controlling the discharge operation by the vehicle 1.

Figure 2:
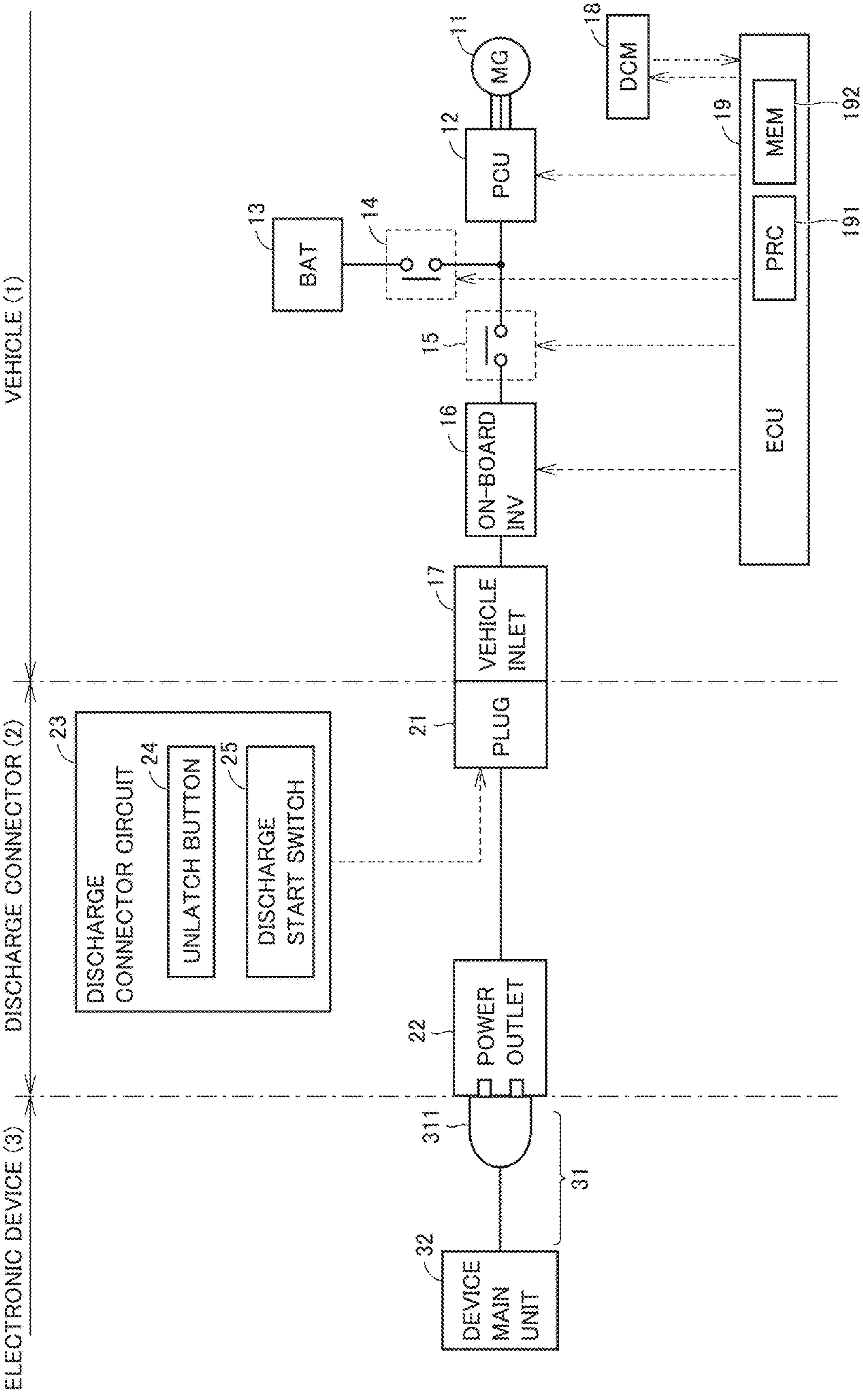
FIG. 2 is a diagram showing a configuration example of a vehicle 1, a discharge connector, and an electronic device.

FIG. 2 is a diagram showing a configuration example of the vehicle 1, the discharge connector 2, and the electronic device 3. In this example, the vehicle 1 is a battery electric vehicle, and includes a motor generator 11, a power control unit (PCU) 12, an on-board battery 13, a system main relay (SMR) 14, a discharge relay 15, an on-board inverter 16, the vehicle inlet 17, a communication module 18, and an electronic control unit (ECU) 19.

The motor generator 11 is, for example, a three-phase AC rotating electric machine. The motor generator 11 uses an AC power, discharged from the on-board battery 13, to rotate the drive shaft. The motor generator 11 is also capable of generating power by regenerative braking. The AC power generated by the motor generator 11 is converted into a direct current (DC) power by the PCU 12 and charged to the on-board battery 13.

The PCU 12 is electrically connected to the motor generator 11. The PCU 12 includes a converter and an inverter (none of which are shown). The PCU 12 performs bi-directional power conversion between the on-board battery 13 and the motor generator 11, in accordance with commands from the ECU 19.

The on-board battery 13 is electrically connected to the SMR 14. The on-board battery 13 is an assembled battery formed of multiple cells (not shown). Each cell is, representatively, a secondary battery such as a lithium-ion battery, a nickel-hydrogen battery, etc. The on-board battery 13 stores power which is supplied from the external charger (not shown) or generated by the motor generator 11. The on-board battery 13 then supplies the motor generator 11 with a DC power for causing a driving force for the vehicle 1 while the vehicle 1 is traveling. While the vehicle 1 is stopped, the on-board battery 13 supplies the on-board inverter 16 with a DC power for AC to DC conversion. Note that a capacitor, such as an electric double layer capacitor, may be employed, instead of the on-board battery 13.

The SMR 14 has one end electrically connected to the on-board battery 13. The SMR 14 has the other end electrically connected between a power line connecting the PCU 12 and the discharge relay 15. The SMR 14 closes/opens in response to commands from the ECU 19.

The discharge relay 15 is electrically connected between the PCU 12 and the on-board inverter 16. Similarly to the SMR 14, the discharge relay 15 closes/opens in response to commands from the ECU 19. When the SMR 14 is closed and the discharge relay 15 is closed, supply of DC power is enabled from the on-board battery 13 to the on-board inverter 16.

The on-board inverter 16 is electrically connected between the discharge relay 15 and the vehicle inlet 17. In this example, the on-board inverter 16 is a two-way charger that can convert AC power into DC power and vice versa. However, the on-board inverter 16 may separately include a one-way charger for converting AC power into DC power and an AC inverter for converting DC power into AC power (none of which are shown).

In the present embodiment, the on-board inverter 16 adjusts the voltage of AC power, in accordance with commands from the ECU 19. More specifically, the on-board inverter 16 is capable of outputting 100V AC power (more specifically, split-phase 100V AC power) and AC 200V AC power (more specifically, split-phase 200V AC power). The on-board inverter 16 is one example of a "power converter" according to the present disclosure. The electric power that is supplied from the vehicle 1 may be DC power. In this case, the "power converter" according to the present disclosure may be a DC-to-DC converter.

The vehicle inlet 17 is electrically connected to the on-board inverter 16. A charging connector (not shown) extending from the charging cable of an external charger, and the discharge connector 2 are insertable to the vehicle inlet 17. When the discharge connector 2 is inserted into the vehicle inlet 17, the vehicle inlet 17 can receive a proximity detection signal (described later) from the discharge connector 2, in addition to outputting a discharging power to the discharge connector 2.

When the vehicle inlet 17 is used to discharge electric power, the term "outlet" may be used, instead of the "inlet." However, the term "inlet" will be used herein, in accordance with the International Standards (IEC 62196-2: 2011) with respect to vehicle couplers. The vehicle inlet 17 corresponds to a "connector" according to the present disclosure.

The communication module 18 is a digital communication module (DCM) capable of wireless communications with the server 9 (see FIG. 1). The vehicle 1 can transmit various data to the server 9 and receive commands from the server 9, through communications by the communication module 18.

The ECU 19 includes a processor 191 such as a CPU, a memory 192 such as a ROM and a RAM, and input/output ports (not shown). In response to signals from various sensors, the ECU 19 controls the devices mounted on the vehicle 1 so that the vehicle 1 is brought into a desired state. Examples of the main control that is performed by the ECU 19 in the present embodiment include a discharge control, in which an electric power is discharged from the vehicle 1 to the electronic device 3 via the discharge connector 2. Note that the ECU 19 may be divided into two or more ECUs by function (e.g., a charge and discharge ECU for controlling charging and discharging by the vehicle 1, a battery ECU for managing the on-board battery 13, a MG ECU for a driving control over the vehicle 1, etc.).

The discharge connector 2 includes a plug (a joint between the discharge connector 2 and the vehicle 1) 21, a power outlet 22, and a discharge connector circuit 23. The discharge connector circuit 23 includes an unlatch button 24 and a discharge start switch 25.

The plug 21 is insertable into the vehicle inlet 17. For example, the plug 21 includes five terminals described below.

Figure 3:
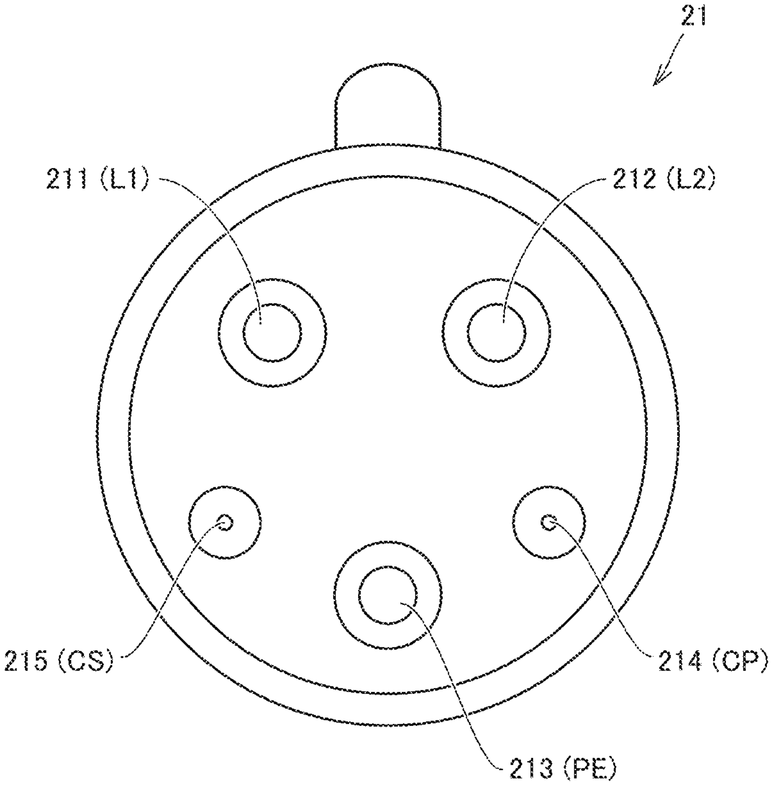
FIG. 3 is a diagram showing one example of terminals included in a plug of the discharge connector.

FIG. 3 is a diagram showing one example of terminals included in the plug 21 of the discharge connector 2. The plug 21 includes an L1 terminal 211, an L2 terminal 212, a PE terminal 213, a CP terminal 214, and a CS terminal 215.

The L1 terminal 211 and the L2 terminal 212 are a pair of AC terminals for transmission of AC power. The PE terminal 213 is a ground terminal which is connected to the body ground of the vehicle 1 as the discharge connector 2 and the vehicle inlet 17 are connected together. The CP terminal 214 is a signal terminal through which a control pilot (CPLT) signal is transmitted when the vehicle 1 is charged externally. The CP terminal 214 corresponds to a "signal terminal" according to the present disclosure. The CS terminal 215 is a terminal through which a proximity detection signal is transmitted. The proximity detection signal will be described in detail, with respect to FIG. 4.

Referring back to FIG. 2, the power outlet 22 is capable of being plugged in by a power plug 311 of the electronic device 3. The discharge connector circuit 23 is a circuit for generating the CPLT signal and the proximity detection signal.

The unlatch button 24 receives user operations for releasing the latch (lock) engagement of the discharge connector 2 (the plug 21) and the vehicle inlet 17. More specifically, as a user inserts the plug 21 into the vehicle inlet 17, the vehicle inlet 17 and the plug 21 are automatically latched by a latch mechanism. As a user operates the unlatch button 24, the latch is released, allowing the plug 21 to be removed from the vehicle inlet 17.

The discharge start switch 25 is a switch for starting a discharge of an electric power from the vehicle inlet 17 to the discharge connector 2. As a user operates the discharge start switch 25, the proximity detection signal changes in voltage (which will be described later in detail). The ECU 19 senses the user operation by detecting this voltage change. If the ECU 19 senses twice in a row the user operation on the discharge start switch 25, the ECU 19 starts a discharge of the electric power from the vehicle inlet 17 to the discharge connector 2.

<Proximity Detection Signal>

Figure 4:
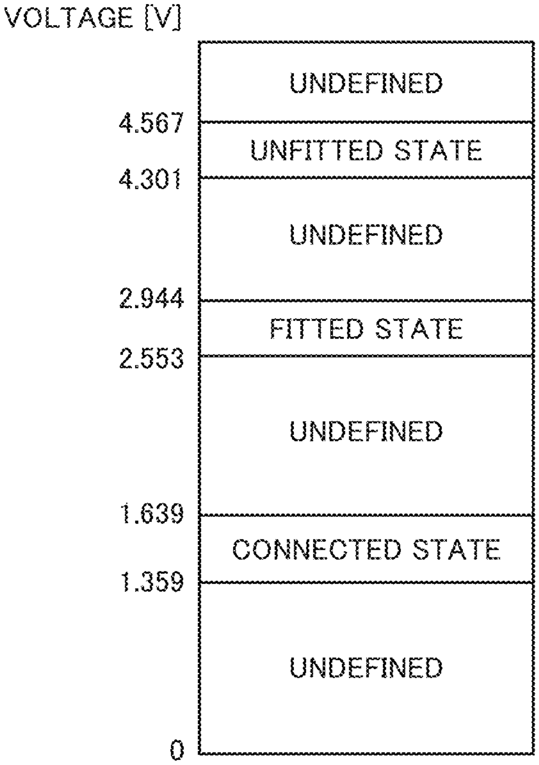
FIG. 4 is a diagram for illustrating voltage ranges of a proximity detection signal, as defined by the International Standards (IEC 61851-1).

FIG. 4 is a diagram for illustrating voltage ranges of the proximity detection signal, as defined by the International Standards (IEC 61851-1). The connection state of the discharge connector 2 and the vehicle inlet 17 is classified into a connected state, a fitted state, or an unfitted state. A voltage range indicative of the connected state, a voltage range indicative of the fitted state, and a voltage range indicative of the unfitted state are defined, for example, according to IEC 61851-1, as voltage ranges for the proximity detection signal.

The connected state refers to a state in which the discharge connector 2 (the plug 21) is inserted into the vehicle inlet 17, all the terminals (see FIG. 3) are electrically connected between the discharge connector 2 and the vehicle inlet 17, and the discharge connector 2 and the vehicle inlet 17 are latched. The fitted state refers to a state in which the discharge connector 2 is inserted into the vehicle inlet 17, all the terminals are electrically connected between the discharge connector 2 and the vehicle inlet 17, and the discharge connector 2 and the vehicle inlet 17 are not latched. The unfitted state refers to any state other than the connected state and the fitted state.

<Control Pilot Signal>

Figure 5:
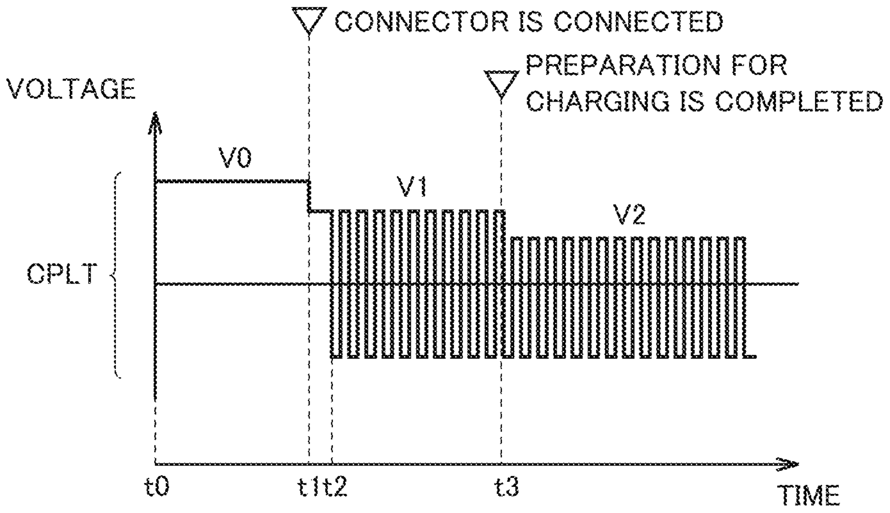
FIG. 5 is a timing chart illustrating one example of a typical control over a control pilot (CPLT) signal when the vehicle is charged.

FIG. 5 is a timing chart illustrating one example of a typical control over the CPLT signal when the vehicle 1 is charged. Here, an example is now described in which a charging connector provided at a tip of a charging cable is connected to the vehicle inlet 17 in order to supply the vehicle 1 with AC power from charging equipment, none of which are shown. Elapsed time is indicated on the horizontal axis. Indicated on the vertical axis is the voltage on the terminal (the CS terminal 215) through which the CPLT signal is transmitted.

At the initial time t0, the charging connector is not connected to the vehicle inlet 17. The voltage of the CPLT signal is V0. A charging circuit interrupt device (CCID) relay disposed within the charging cable is in a non-conductive state.

At a time t1, as the charging connector is connected to the vehicle inlet 17, the voltage of the CPLT signal decreases from V0 to V1, from which the controller included in the charging cable senses that the charging connector is connected to the vehicle inlet 17.

At a time t2, the controller controls an oscillation circuit included in the charging cable so that the CPLT signal oscillates in a predetermined frequency and at a predetermined duty ratio, given that the upper limit voltage is V1. The ECU 19 of the vehicle 1 detects the duty ratio of the CPLT signal, thereby obtaining the rated current of the charging cable.

More specifically, the International Standards (such as IEC 61851) defines that a certain fixed value (1 kHz) is used as the frequency of the CPLT signal. The International Standards also defines that the duty ratio for the CPLT signal has a value in a range from 10% to 96%. If the duty ratio is in a range from 10% to 85%, the rated current is represented by a value obtained by multiplying the duty ratio d by 0.6 A. If the duty ratio is in a range from 85% to 96%, in contrast, the rated current is represented by a value obtained by subtracting 64% from the duty ratio d and then multiplying the difference by 2.5 A.

At a time t3, upon completion of a predetermined process for preparation prior to the start of the power supply (preparation for charging), the ECU 19 reduces the voltage of the CPLT signal from V1 to V2, setting the upper limit voltage of the oscillating CPLT signal to V2. Along with this, the controller changes the state of the CCID relay from the non-conductive state to a conductive state. Consequently, the supply of AC power is enabled from the charging equipment to the vehicle 1.

<Identifying of Discharge Connectors>

In order to use various electronic devices 3, there is a demand for supply, from the vehicle 1, of AC power having a voltage appropriate to the operating voltage of the electronic device 3. Desirably, such a power having an appropriate voltage is supplied in an as simple configuration as possible.

Thus, in the present embodiment, the discharge connector 2, which is used to supply an electric power to the electronic device 3, is prepared in response to the operating voltage of the electronic device 3. More specifically, a discharge connector 2A is used to supply an electric power to the electronic device 3 operating at AC 100V, and another discharge connector 2B is used to supply an electric power to the electronic device 3 operating at AC 200V. The ECU 19 identifies which one of the discharge connectors 2A and 2B is connected to the vehicle inlet 17, based on the voltage of the CPLT signal at the vehicle inlet 17. This allows the ECU 19 to determine the voltage to be supplied to the electronic device 3, enabling an AC power having an appropriate voltage to be supplied to the electronic device 3.

Figure 6:
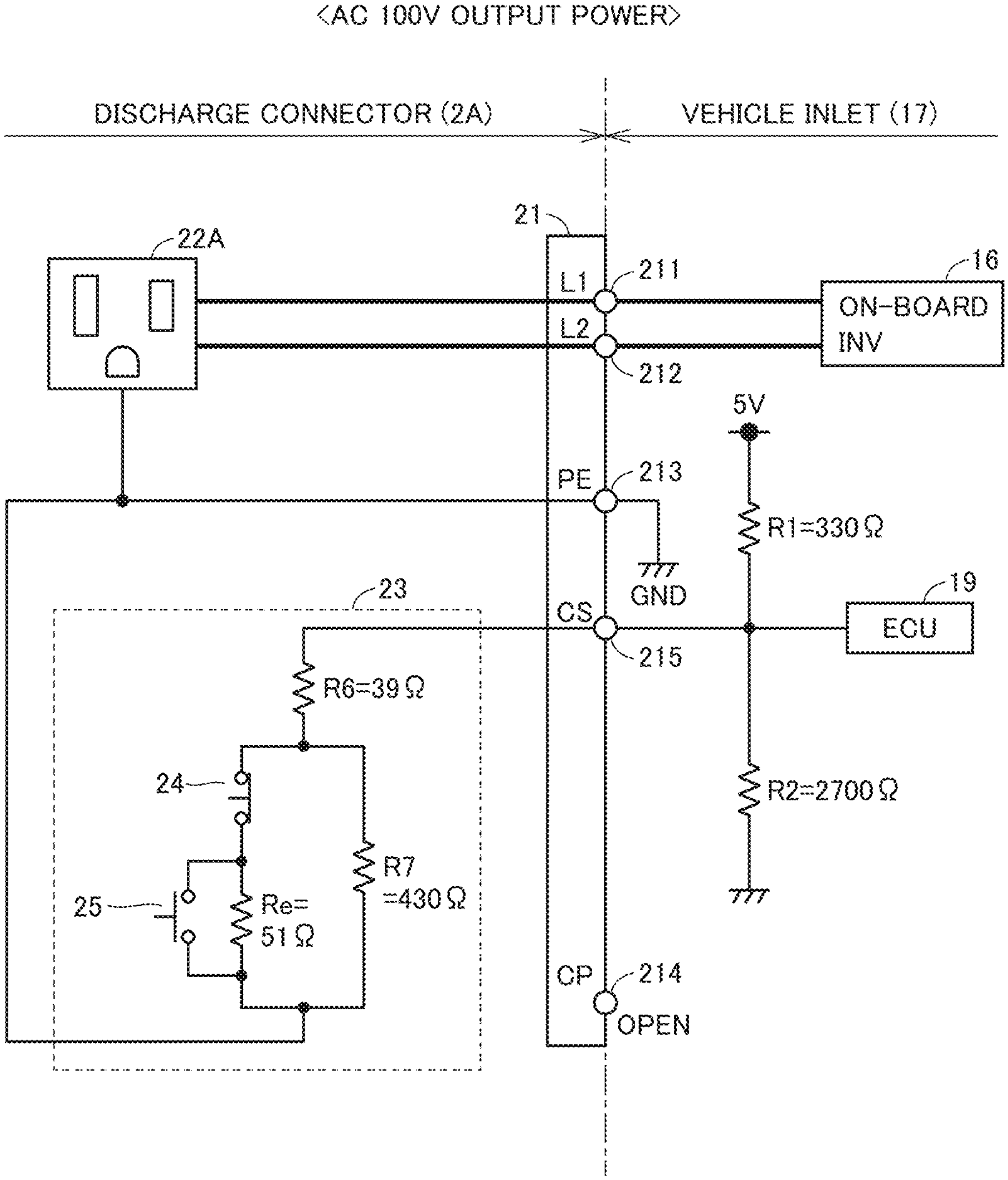
FIG. 6 is a circuit block diagram showing one configuration example of a discharge connector for AC 100V, according to the embodiment.
Figure 7:
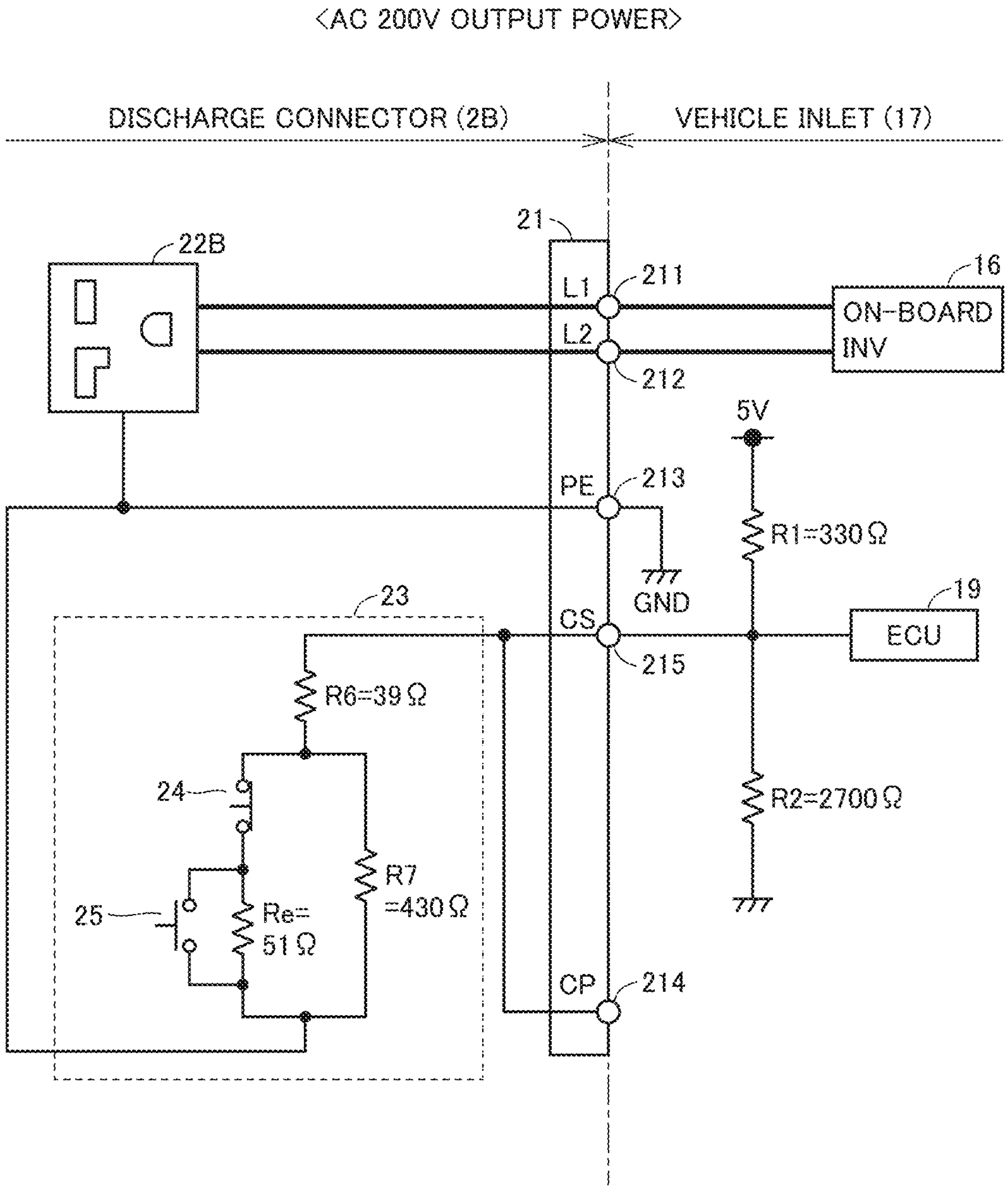
FIG. 7 is a circuit block diagram showing one configuration example of a discharge connector for AC 200V, according to the embodiment.

FIG. 6 is a circuit block diagram showing one configuration example of the discharge connector 2A for AC 100V, according to the present embodiment. FIG. 7 is a circuit block diagram showing one configuration example of the discharge connector 2B for AC 200V, according to the present embodiment.

Referring to FIG. 6, the discharge connector 2A for AC 100V includes a power outlet 22A for AC 100V and a discharge connector circuit 23. The discharge connector circuit 23 includes an unlatch button 24, a discharge start switch 25, and resistors R6, R7, and Re.

The resistor R7 and the resistor Re are connected in parallel. The resistor R6 is connected in series to a parallel circuit formed of the resistor R7 and the resistor Re. The unlatch button 24 is connected in series to the resistor Re. The discharge start switch 25 is connected in parallel to the resistor Re. The discharge start switch 25 is, for example, a normally-off switch, which is open when not in operation, and is shorted when in operation.

If the discharge connector 2A and the vehicle inlet 17 are connected, the voltage on the CS terminal 215 is pulled up by a 5V power supply and a pull-up resistor R1 of the vehicle inlet 17. In this example, the resistor R6=395Ω, the resistor R7=430Ω, and the resistor Re=51Ω. Configuring each resistance as such allows the proximity detection signal to change in the voltage ranges shown in FIG. 4 in the unfitted state, the fitted state, and the connected state.

Meanwhile, the CP terminal 214 is open, and not electrically connected to the other circuits. The voltage level (=the CPLT signal) on the CP terminal 214 is in an indeterminate state (high impedance).

Referring to FIG. 7, the discharge connector 2B for AC 200V output power includes a power outlet 22B for AC 200V, instead of the power outlet 22A for AC 100V. In this example, the discharge connector circuit 23 is equal in configuration to the discharge connector circuit 23 included in the discharge connector 2A for AC 100V.

Furthermore, the discharge connector 2B has the CP terminal 214 and the CS terminal 215 electrically connected together. Accordingly, the CP terminal 214 is equal in voltage level to the CS terminal 215. In other words, the CPLT signal changes in the same manner as the proximity detection signal.

Figure 8:
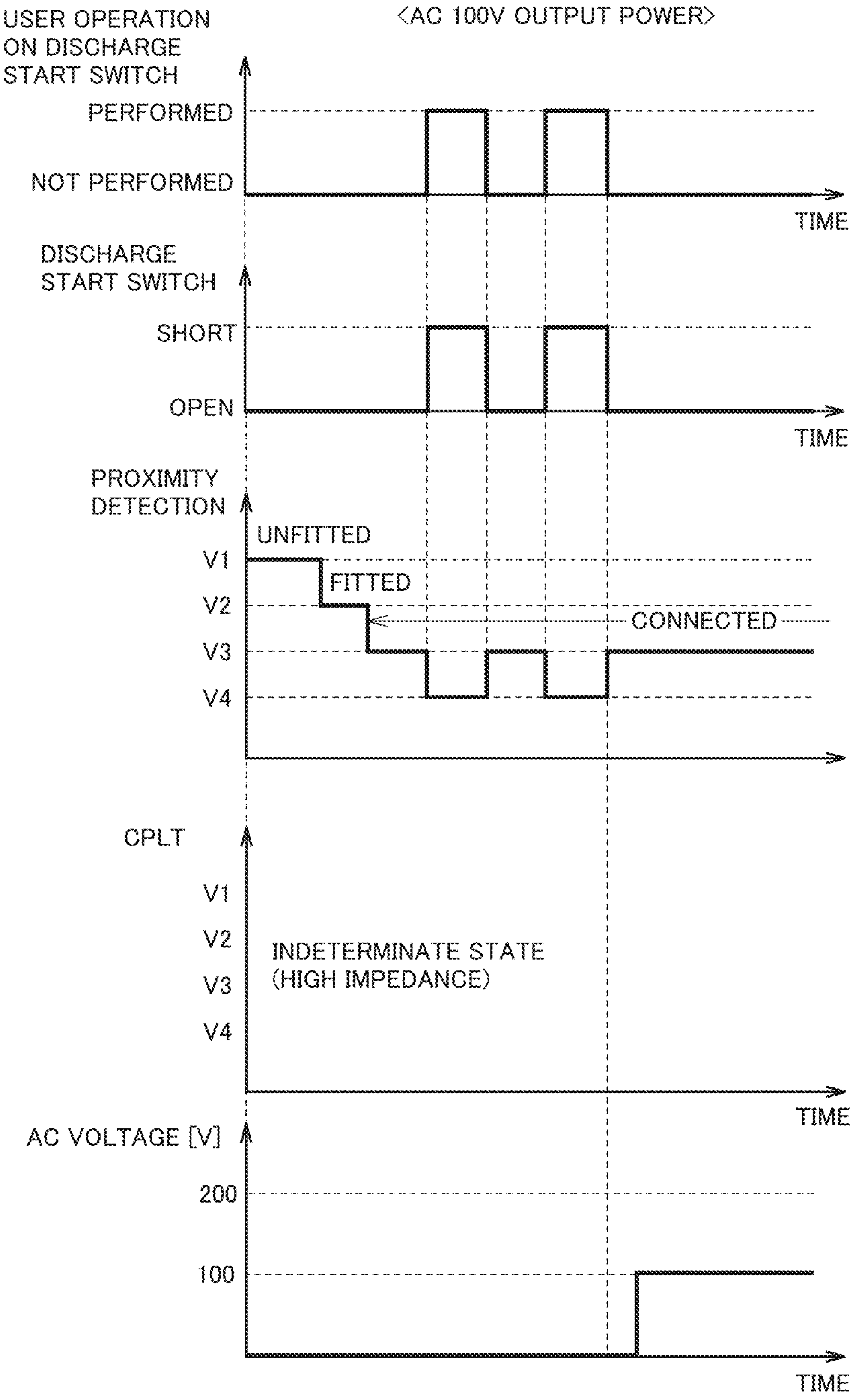
FIG. 8 is a time diagram showing changes over time in proximity detection signal and CPLT signal when the discharge connector for AC 100V is used, according to the embodiment.
Figure 9:
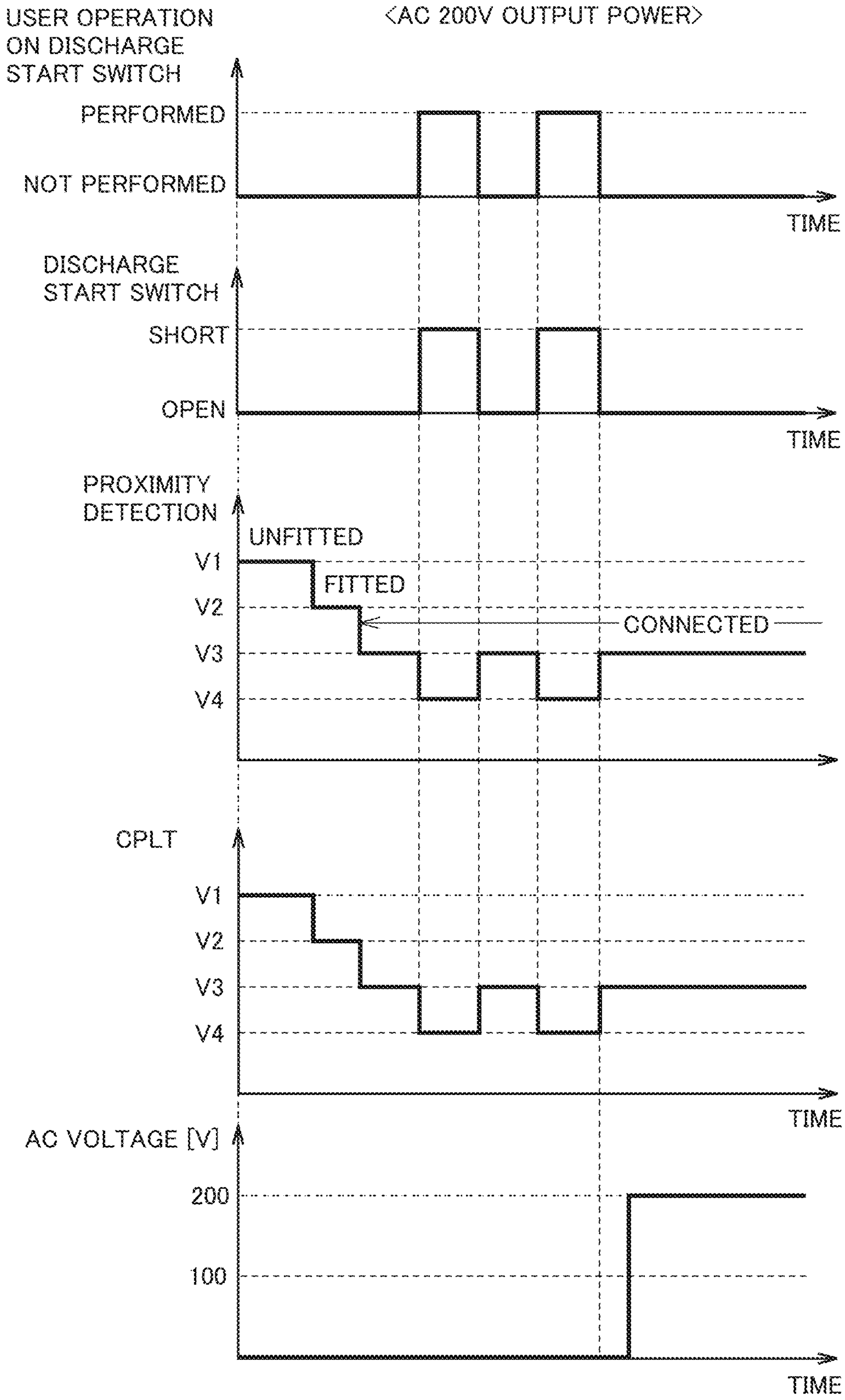
FIG. 9 is a time diagram showing changes over time in proximity detection signal and CPLT signal when the discharge connector for AC 200V is used, according to the embodiment.

FIG. 8 is a time diagram showing changes over time in proximity detection signal and CPLT signal when the discharge connector 2A for AC 100V is used, according to the present embodiment. FIG. 9 is a time diagram showing changes over time in proximity detection signal and CPLT signal when the discharge connector 2B for AC 200V is used, according to the present embodiment. Elapsed time is indicated on the horizontal axis. Indicated from top to bottom on the vertical axis are: the presence or absence of the user operation (turn-on/turn-off) on the discharge start switch 25; whether the discharge start switch 25 is shorted/open; the voltage of the proximity detection signal; the voltage of the CPLT signal; and the voltage of AC power output from the on-board inverter 16.

Referring to FIG. 8, as the user inserts the discharge connector 2A for AC 100V into the vehicle inlet 17, the discharge connector 2A and the vehicle inlet 17 are automatically latched, at which time the connection state of the discharge connector 2A and the vehicle inlet 17 transitions from the unfitted state to the fitted state, then the connected state. Along with this, the proximity detection signal changes in voltage range from V1 to V2, then V3. The V1 is a value in a voltage range encompassing the voltage range (4.301V to 4.567V) corresponding to the unfitted state in the example of FIG. 4. The V2 is a value in a voltage range encompassing the voltage range (2.553V to 2.944V) corresponding to the fitted state. The V3 is a value in a voltage range, encompassing the voltage range (1.359V to 1.639V) corresponding to the connected state.

Subsequently, the user turns on twice in a row the discharge start switch 25 in order to initiate the supply of power from the vehicle 1 to the electronic device 3. The turn-on operation is required twice for the purpose of prevention of inadvertent operation. At this time, the point of contact of the normally-off discharge start switch 25 changes from the short state to the open state, the short state, then the open state. On that occasion, the proximity detection signal changes in voltage range from V3 to V4, V3, then V4. If such changes are detected in voltage of the proximity detection signal, the ECU 19 controls the on-board inverter 16 so that the on-board inverter 16 begins an output of AC 100V. During this time, the CPLT signal is in the indeterminate state at all times.

Referring to FIG. 9, as the user inserts the discharge connector 2B for AC 200V into the vehicle inlet 17, the connection state of the discharge connector 2B and the vehicle inlet 17 transitions from the unfitted state to the fitted state, then the connected state, as with FIG. 8. Along with this, the proximity detection signal changes in voltage range from V1 to V2, then V3.

Subsequently, as the user turns on twice in a row the discharge start switch 25, the point of contact of the discharge start switch 25 changes from the short state to the open state, the short state, then the open state, and the proximity detection signal changes in voltage range from V3 to V4, V3, then V4. At this time, the CPLT signal at the discharge connector 2B changes in voltage range from V3 to V4, V3, then V4, as with the proximity detection signal. If such changes are detected in voltage of the proximity detection signal, the ECU 19 controls the on-board inverter 16 so that the on-board inverter 16 begins an output of AC 200V.

Figure 10:
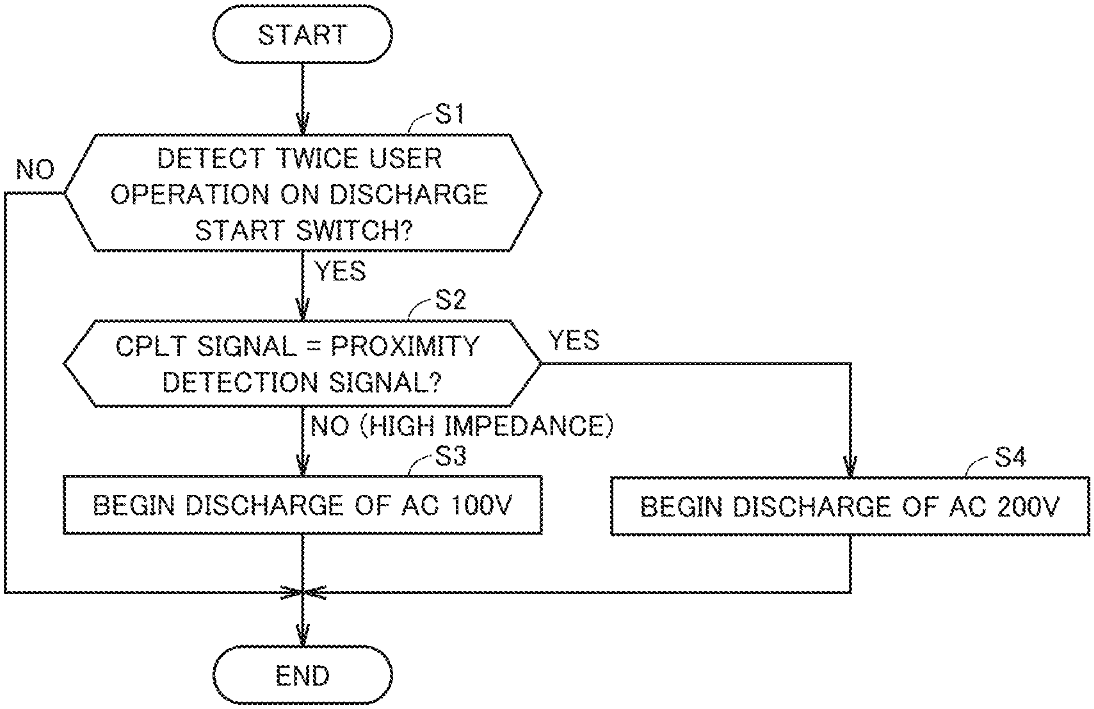
FIG. 10 is a flowchart illustrating a process which is performed by an electronic control unit (ECU), according to the embodiment.

FIG. 10 is a flowchart illustrating a process which is performed by the ECU 19, according to the present embodiment. The process is invoked from the main routine (not shown) and executed once predetermined conditions are satisfied, for example. The SMR 14 and the discharge relay 15 are both closed when the process is executed. Each process step is implemented by software processing by the ECU 19. However, each process step may be implemented by hardware (an electric circuit) disposed within the ECU 19. Hereinafter, each process step is abbreviated as S.

In S1, the ECU 19 determines whether a user operation is detected twice on the discharge start switch 25. More specifically, the ECU 19 determines whether a change is detected twice within the voltage range of the proximity detection signal corresponding to the connected state (see FIG. 4). If a user operation is not detected twice on the discharge start switch 25 (NO in S1), the ECU 19 returns the process to the main routine.

If a user operation is detected twice on the discharge start switch 25 (YES in S1), the ECU 19 determines whether the CPLT signal is equal to the proximity detection signal (S2). Note that the CPLT signal being equal to the proximity detection signal means that the difference in voltage is within a predetermined value between the CPLT signal and the proximity detection signal. The voltage of the proximity detection signal is one example of a "reference voltage" according to the present disclosure.

If the CPLT signal is equal to the proximity detection signal (YES in S2), the ECU 19 controls the on-board inverter 16 so that the on-board inverter 16 begins an output of AC 200V (S4). In contrast, if the CPLT signal is not equal to the proximity detection signal (NO in S2), more specifically in the example of FIG. 6, if the CPLT signal is in the indeterminate state and the voltage on the CP terminal 214 is an open-circuit voltage (high impedance), the ECU 19 controls the on-board inverter 16 so that the on-board inverter 16 begins an output of AC 100V (S3).

As described above, in the present embodiment, the ECU 19 identifies the type of the discharge connector 2 connected to the vehicle inlet 17 (whether the discharge connector 2 is the discharge connector 2A for AC 100V or the discharge connector 2B for AC 200V), based on the CPLT signal. More specifically, the ECU 19 compares the CPLT signal with the proximity detection signal. If the CPLT signal is equal to the proximity detection signal, the ECU 19 determines that the discharge connector 2B for AC 200V is connected to the vehicle inlet 17. If the CPLT signal is in the indeterminate state (the voltage on the CP terminal 214 is an open-circuit voltage), the ECU 19 determines that the discharge connector 2A for AC 100V is connected to the vehicle inlet 17. This difference is caused by a simple difference in circuit structure as to whether the CP terminal 214 and the CS terminal 215 are electrically connected or not. Thus, according to the present embodiment, AC power having an appropriate voltage can be supplied in a simple configuration.

Note that the ECU 19 may compare the voltage on the CP terminal 214 with a "predetermined voltage" to switch between starting the output of AC 100V and starting the output of AC 200V. The predetermined voltage is defined by a value between the voltage on the CP terminal when the CPLT signal is in the indeterminate state (typically, a low voltage close to zero V) and the voltage when the CPLT signal is equal to the proximity detection signal (see FIG. 4). If the voltage on the CP terminal 214 is lower than (or equal to) the predetermined voltage, the ECU 19 can control the on-board inverter 16 so that the on-board inverter 16 begins an output of AC 100V. If the voltage on the CP terminal 214 is higher than the predetermined voltage, the ECU 19 can control the on-board inverter 16 so that the on-board inverter 16 begins an output of AC 200V.

Moreover, the predetermined voltage may not depend on the proximity detection signal. The predetermined voltage can be defined based on the voltage supplied from a voltage source (e.g., a 3.3V voltage source, a 5V voltage source), other than the proximity detection signal. For example, the predetermined voltage can be defined as 4V, if the CP terminal 214 included in the discharge connector 2A for AC 100V is open and a 5V voltage is applied to the CP terminal 214 included in the discharge connector for AC 200V. Then, the ECU 19 determines whether the voltage on the CP terminal 214 is higher than the predetermined voltage (4 kV), and can thereby change the voltage of the AC power from the on-board inverter 16.

[Variation]

Figure 11:
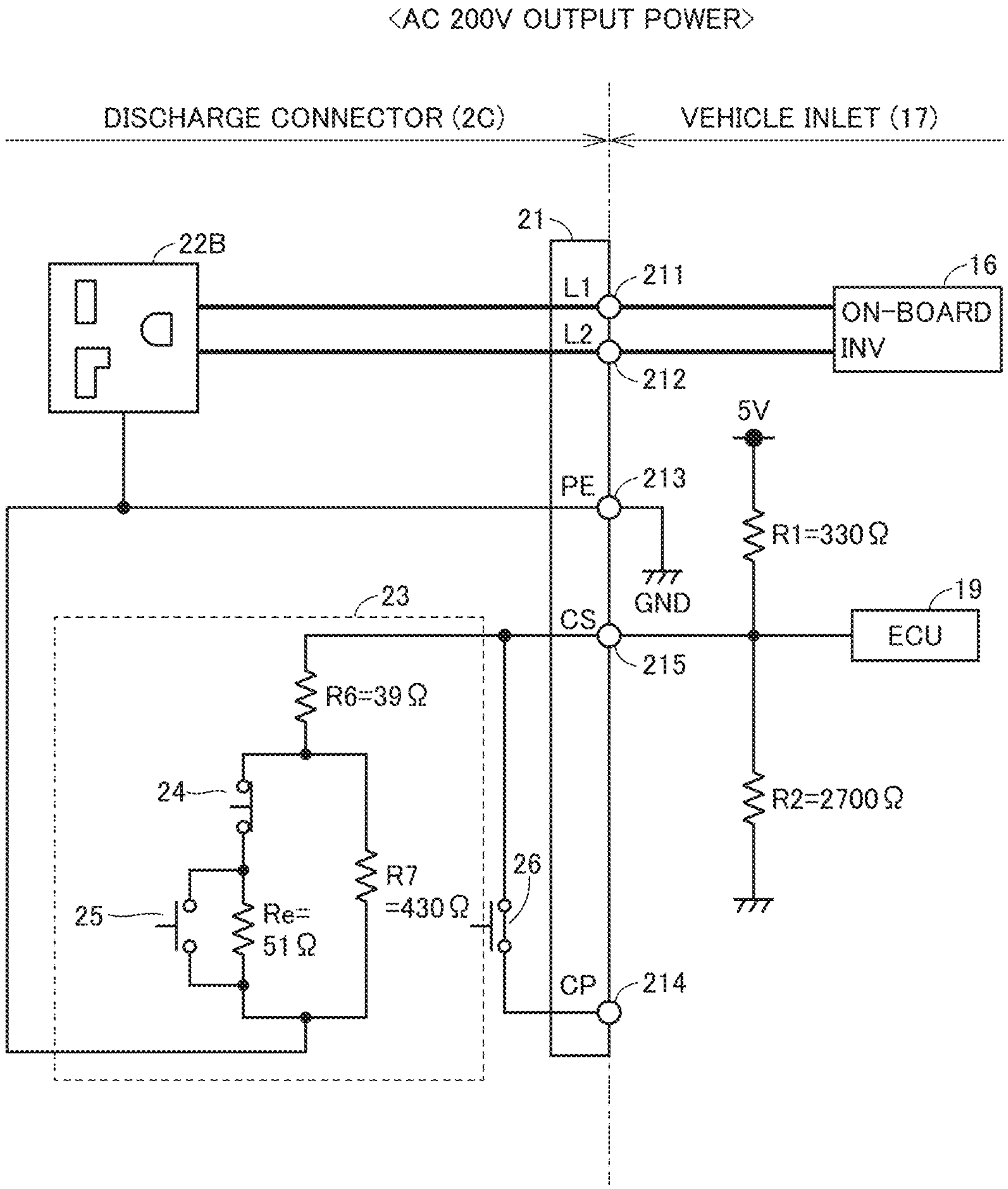
FIG. 11 is a circuit block diagram showing one configuration example of the discharge connector for AC 200V according to a variation of the embodiment.

FIG. 11 is a circuit block diagram showing one configuration example of the discharge connector for AC 200V according to a variation of the embodiment. A discharge connector 2C differs from the discharge connector 2B (see FIG. 7) in that the discharge connector 2C further includes a switch 26.

The switch 26 is electrically connected between the CP terminal 214 and the CS terminal 215. The switch 26 operates in conjunction with the discharge start switch 25. In other words, as a user turns the discharge start switch 25 on, the discharge start switch 25 and the switch 26 are shorted. This brings the CP terminal 214 and the CS terminal 215 into equipotential. If a user does not turn the discharge start switch 25 on, in contrast, the switch 26 remains open.

Figure 12:
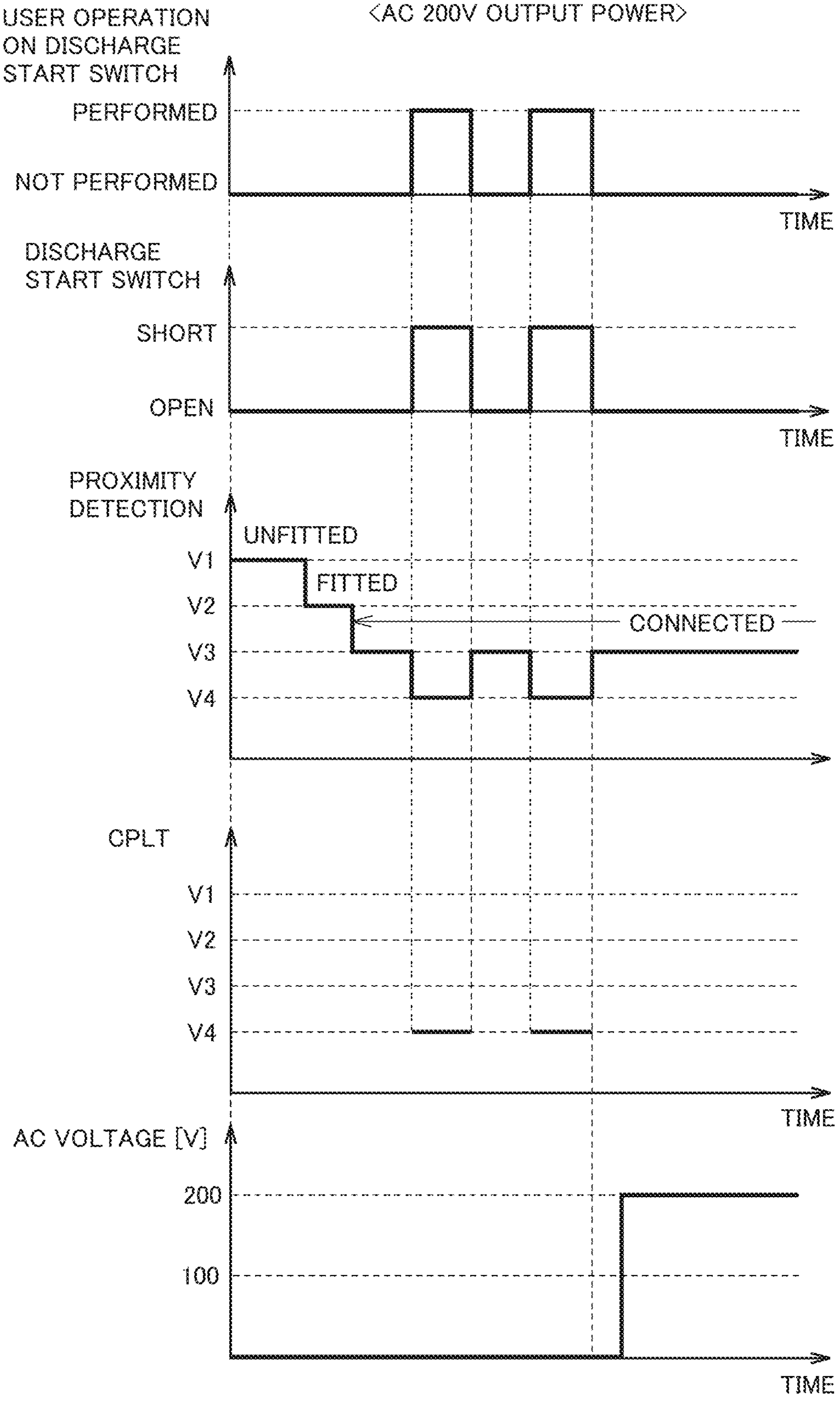
FIG. 12 is a time diagram showing changes over time in proximity detection signal and CPLT signal when the discharge connector for AC 200V is used, according to a variation of the embodiment.

FIG. 12 is a time diagram showing changes over time in proximity detection signal and CPLT signal when the discharge connector 2C for AC 200V is used, according to the variation of the embodiment. While, in the embodiment (see FIG. 9), the CPLT signal changes in the same manner as the proximity detection signal at all times, in the variation of the embodiment, the CPLT signal is equal to the proximity detection signal only while the discharge start switch 25 is on. The CPLT signal is in the indeterminate state during other time periods.

If the discharge start switch 25 is not turned on, the CP terminal 214 is electrically disconnected from the discharge connector circuit 23 and all circuits on the vehicle inlet 17 side (the pull-up circuit, etc.). Accordingly, noise can be prevented from coming into these circuits to the CP terminal 214. As a result, a malfunction can be prevented, which is caused by false detection of the voltage on the CP terminal 214 during a period in which the discharge start switch 25 is not turned on.

Note that the circuit structures of FIGS. 7 and 11 have been described with reference to the CP terminal 214 and the CS terminal 215 being directly connected together or connected together via the switch 26. However, another circuit may be connected between the CP terminal 214 and the CS terminal 215. For example, an element for converting between voltage levels (such as a voltage divider resistor) may be connected between the CP terminal 214 and the CS terminal 215.

FIGS. 9 to 11 have been described with reference to the ECU 19 of the vehicle 1 identifying the type of the discharge connector 2 based on the CPLT signal. However, the type of the discharge connector 2 is not limited to be identified by the ECU 19, and may be identified by, for example, the server 9. The vehicle 1 transmits the voltage of the proximity detection signal and the voltage of the CPLT signal to the server 9. The server 9 identifies the type of the discharge connector 2 by comparing the voltage of the CPLT signal with the voltage of the proximity detection signal, and transmits a result of the identification to the vehicle 1. This allows the server 9 to instruct the ECU 19 as to which one of AC 100V and AC 200V at which the ECU 19 should control the on-board inverter 16.

The description also has been given that an output of AC power from the on-board inverter 16 begins if a user operation is detected twice on the discharge start switch 25. However, the ECU 19 may cause the on-board inverter 16 to begin an output of AC power, provided that an operation on the discharge start switch 25 is detected once.

Furthermore, the user operation on the discharge start switch 25 is not necessary to begin the electric power discharge. The discharge connector 2 may not include the discharge start switch 25. For example, the on-board inverter 16 may begin an output of AC power based on a result of comparison of the voltage of the CPLT signal with the voltage of the proximity detection signal at a moment a specified time period elapses since the discharge connector 2 and the vehicle inlet 17 have been connected together (since the discharge connector 2 has been latched with the vehicle inlet 17).

Embodiments 1 and 2 have been described with reference to AC power being supplied from the vehicle 1 or the EVPS 4. However, the power supplied from the vehicle 1 or the EVPS 4 is not limited to AC power, and may be DC power.

The power supply technique according to the present disclosure is applicable not limited to vehicles, and also to any energy storage and management system (ESMS). For example, the power supply technique according to the present disclosure may be applied to mobile, battery-powered power supply apparatuses.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle controller for controlling a vehicle capable of externally discharging an electric power via a discharge connector, the vehicle including:

a power converter that adjusts a voltage of the electric power; and a connector that, when the discharge connector is connected to the connector, discharges to the discharge connector the electric power output from the power converter, the connector having:

a control pilot signal terminal through which a control pilot signal is transmitted when the vehicle is charged externally; and a proximity detection signal terminal through which a proximity detection signal is transmitted, the vehicle controller comprising a processor that controls the power converter, wherein the processor determines a type of the discharge connector connected to the connector, based on a voltage on the control pilot signal terminal and a voltage on the proximity detection signal terminal.

2. The vehicle controller according to claim 1, wherein the processor sends, to a server, a voltage of the control pilot signal and a voltage of the proximity signal.

3. The vehicle controller according to claim 2, wherein the processor determines, based on a result received from the server, the voltage of the electric power output from the power converter.

4. The vehicle controller according to claim 1, wherein the processor:

determines the voltage of the electric power output from the power converter to be a first voltage, when the voltage on the control pilot signal terminal is lower than a predetermined voltage; and determines the voltage of the electric power output from the power converter to be a second voltage higher than the first voltage, when the voltage on the control pilot signal terminal is higher than the predetermined voltage.

5. The vehicle controller according to claim 1, wherein the processor:

determines the voltage of the electric power output from the power converter to be a first voltage, when the voltage on the control pilot signal terminal is an open-circuit voltage; and determines the voltage of the electric power output from the power converter to be a second voltage different from the first voltage, when the voltage on the control pilot signal terminal differs from the open-circuit voltage.

6. The vehicle controller according to claim 5, wherein the processor determines the voltage of the electric power output from the power converter to be the second voltage, when the voltage on the control pilot signal terminal depends on the voltage on the proximity detection signal terminal.

7. The vehicle controller according to claim 6, wherein the processor determines the voltage of the electric power output from the power converter to be the second voltage, when the voltage on the control pilot signal terminal is equal to the voltage on the proximity detection signal terminal.

8. A vehicle, comprising the vehicle controller according to claim 1.

9. A power supply system, comprising:

the vehicle according to claim 8; and the discharge connector.

10. A method for supplying an electric power from a vehicle to outside via a discharge connector, the vehicle including a connector to which the discharge connector is connected, and adjusting a voltage of an electric power discharged from the connector, the connector having:

a control pilot signal terminal through which a control pilot signal is transmitted when the vehicle is charged externally; and a proximity detection signal terminal through which a proximity detection signal is transmitted, the method comprising:

obtaining a voltage on the control pilot signal terminal;

obtaining a voltage on the proximity detection signal terminal; and determining a type of the discharge connector connected to the connector, based on the voltage on the control pilot signal terminal and the voltage on the proximity detection signal terminal.

* * * * *